(12) United States Patent
Nucci et al.

(10) Patent No.: US 10,346,939 B1
(45) Date of Patent: Jul. 9, 2019

(54) TRAVELLER CONTENT SERVICE

(71) Applicant: Narus, Inc., Sunnyvale, CA (US)

(72) Inventors: Antonio Nucci, San Jose, CA (US); Ram Keralapura, San Jose, CA (US)

(73) Assignee: Narus, Inc., Sunnyvale, CA (US)

( * ) Notice: Subject to any disclaimer, the term of this patent is extended or adjusted under 35 U.S.C. 154(b) by 384 days.

(21) Appl. No.: 13/720,181

(22) Filed: Dec. 19, 2012

(51) Int. Cl.
*G06Q 30/06* (2012.01)
*G06Q 50/30* (2012.01)
*G06Q 10/02* (2012.01)
*H04L 29/08* (2006.01)

(52) U.S. Cl.
CPC .......... *G06Q 50/30* (2013.01); *G06Q 10/025* (2013.01); *H04L 67/18* (2013.01)

(58) Field of Classification Search
USPC ............ 348/333.01; 709/203, 218; 345/173; 455/418, 422.1, 456.1; 340/438; 705/7.11, 13
See application file for complete search history.

(56) References Cited

U.S. PATENT DOCUMENTS

| | | | | |
|---|---|---|---|---|
| 8,138,907 | B2 * | 3/2012 | Barbeau | G01C 21/20 340/457 |
| 2001/0037360 | A1 * | 11/2001 | Ekkel | 709/203 |
| 2004/0035315 | A1 * | 2/2004 | Richards | 104/124 |
| 2005/0136917 | A1 * | 6/2005 | Taylor | 455/432.1 |
| 2012/0004841 | A1 * | 1/2012 | Schunder | 701/201 |
| 2013/0006775 | A1 * | 1/2013 | Jordan et al. | 705/14.62 |
| 2013/0074115 | A1 * | 3/2013 | Hyde et al. | 725/30 |
| 2015/0332386 | A1 * | 11/2015 | Pappas | G06Q 30/0641 705/14.66 |

* cited by examiner

*Primary Examiner* — Akiba K Allen
(74) *Attorney, Agent, or Firm* — Kwan & Olynick LLP (57) ABSTRACT

A method to provide traveler content service. The method includes receiving, from the traveler and prior to the trip, a request to access traveler content during the trip, wherein the request comprises travel ticket information associated with the trip and access information to a source of the traveler content, wherein the trip crosses a region with no access to the source of the traveler content, retrieving, prior to the trip, the traveler content from the source using the access information, transmitting, in response to detecting a first vehicle assigned to the trip at a departure port of the trip, the traveler content to a first traveler content repository onboard the first vehicle to generate a traveler content first onboard copy, and providing, during the trip and by an onboard computer processor of the first vehicle, the traveler content first onboard copy from the first traveler content repository to the traveler.

17 Claims, 7 Drawing Sheets

TRAVELLER CONTENT SERVICE

BACKGROUND OF THE INVENTION

With the advances of aviation, people fly more often than ever. People fly for both business and pleasure. Unfortunately, traveling via air has become so tiresome that people would try to avoid flying by all means if at all possible. Yet traveling by air is a must for the increasingly interconnected world. Nevertheless, people are forced to lose valuable time and energy for air travel. Although in-flight entertainment system exists, the overall travel experience can still be very stressful for many people, far away to be a comfortable, productive and enjoyable experience.

SUMMARY

In general, in one aspect, the present invention relates to a method to provide traveler content service during a trip of a traveler. The method includes receiving, from the traveler and prior to the trip, a request to access traveler content during the trip, wherein the request comprises travel ticket information associated with the trip and access information to a source of the traveler content, wherein the trip crosses a region with no access to the source of the traveler content, retrieving, prior to the trip, the traveler content from the source using the access information, transmitting, in response to detecting a first vehicle assigned to the trip at a departure port of the trip, the traveler content to a first traveler content repository onboard the first vehicle to generate a traveler content first onboard copy, and providing, during the trip and by an onboard computer processor of the first vehicle, the traveler content first onboard copy from the first traveler content repository to the traveler.

In general, in one aspect, the present invention relates to a system for providing traveler content service during a trip of a traveler. The system includes (a) a source of the traveler content, comprising a computer server and a repository, (b) a traveler content computer system comprising (1) a traveler content service manager executing on a processor of the traveler content computer system and comprising (i) a traveler content ordering module configured to receive, from the traveler and prior to the trip, a request to access traveler content during the trip, wherein the request comprises travel ticket information associated with the trip and access information to a source of the traveler content, wherein the trip crosses a region with no access to the source of the traveler content, and (ii) a pre-boarding module configured to retrieve, prior to the trip, the traveler content from the source using the access information, and transmit, in response to detecting a first vehicle assigned to the trip at a departure port of the trip, the traveler content to a first traveler content repository onboard the first vehicle to generate a traveler content first onboard copy, (2) a traveler content service repository configured to store a copy of the traveler content, and (c) an onboard computer system onboard the first vehicle and comprising an onboard content manager executing on an onboard computer processor of the first vehicle and configured to provide, during the trip, the traveler content first onboard copy from the first traveler content repository to the traveler, and the first traveler content repository configured to store the traveler content first onboard copy.

In general, in one aspect, the present invention relates to a computer readable medium storing instructions, when executed by the computer providing traveler content service during a trip of a traveler. The instructions include functionality for receiving, from the traveler and prior to the trip, a request to access traveler content during the trip, wherein the request comprises travel ticket information associated with the trip and access information to a source of the traveler content, wherein the trip crosses a region with no access to the source of the traveler content, retrieving, prior to the trip, the traveler content from the source using the access information, transmitting, in response to detecting a first vehicle assigned to the trip at a departure port of the trip, the traveler content to a first traveler content repository onboard the first vehicle to generate a traveler content first onboard copy, and providing, during the trip, the traveler content first onboard copy from the first traveler content repository to the traveler.

Other aspects and advantages of the invention will be apparent from the following description and the appended claims.

BRIEF DESCRIPTION OF DRAWINGS

FIGS. 1.1 and 1.2 show a system block diagram according to aspects of the invention.

FIGS. 3.1-3.3 show an example according to aspects of the invention.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Figure 11:
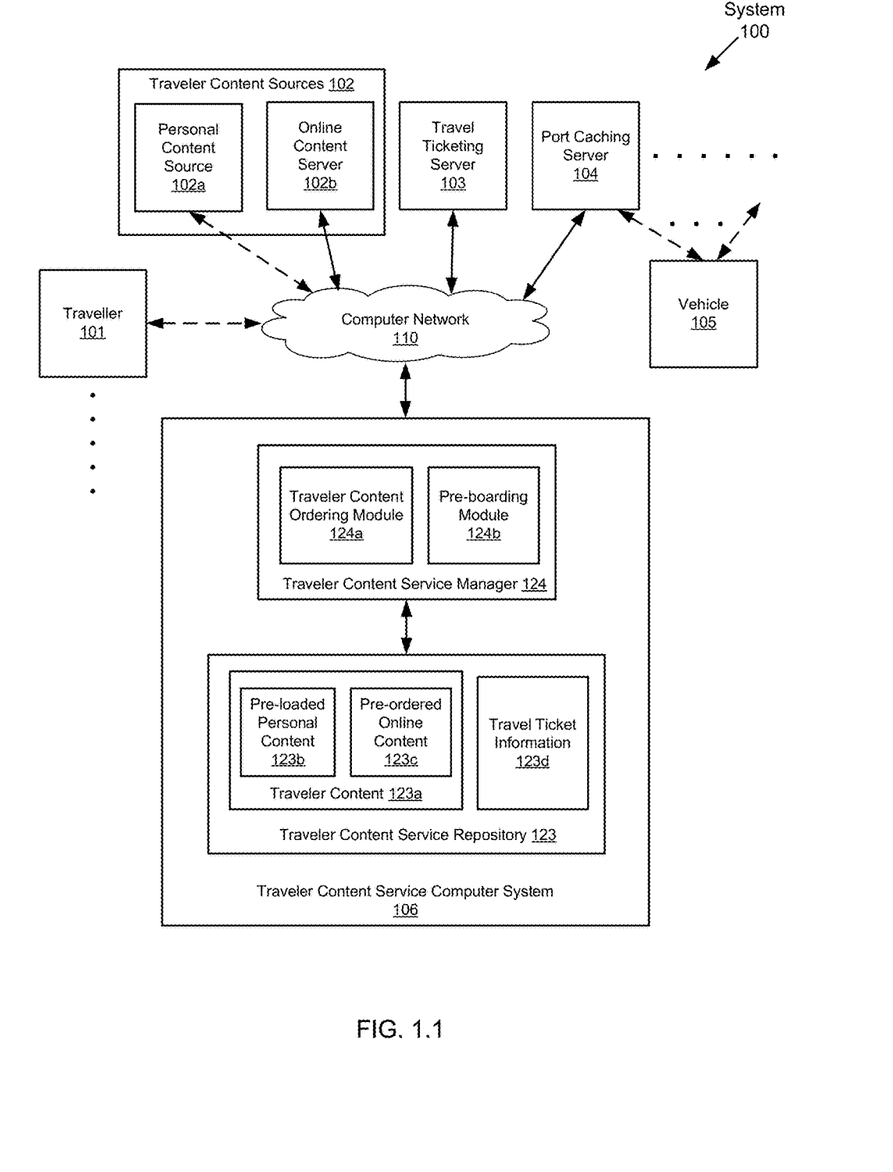
Figure 12:
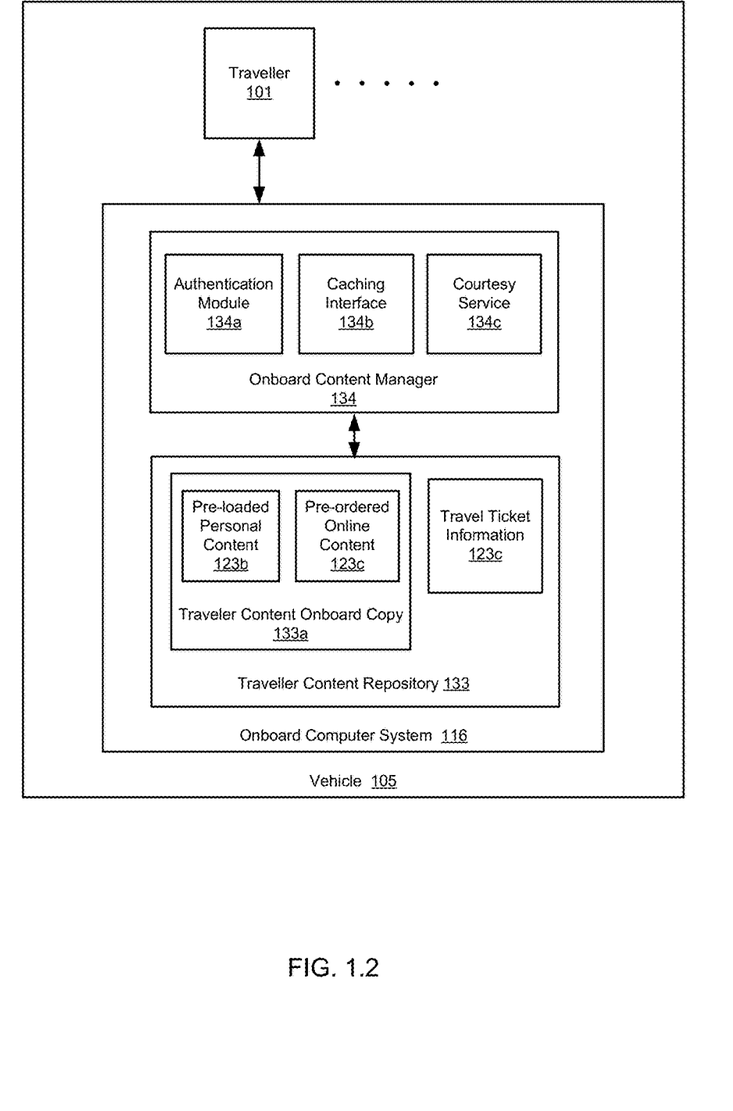

FIGS. 1.1 and 1.2 show a system block diagram of a system (100) in accordance with one or more embodiments of the invention. Those skilled in the art, having the benefit of this detailed description, will appreciate the components shown in FIGS. 1.1 and 1.2 may differ among embodiments of the invention, and that one or more of the components may be optional. Although specific numbers of components are shown in FIGS. 1.1 and 1.2, different number of each component may be included. In one or more embodiments of the invention, one or more of the components shown in FIGS. 1.1 and 1.2 may be omitted, repeated, supplemented, and/or otherwise modified from that shown in FIGS. 1.1 and 1.2. Accordingly, the specific arrangement of components shown in FIGS. 1.1 and 1.2 should not be construed as limiting the scope of the invention.

As shown in FIG. 1.1, the system (100) includes a traveler (101) embarking on a trip, the traveler content sources (102) where the traveler (101) may access traveler content when he/she is online, a travel ticketing server (103), multiple port caching servers (e.g., port caching server (104)) located at various ports traversed by the traveler during the trip, and a traveler content service computer system (106) for providing traveler content service to the traveler (101) throughout the trip. The aforementioned components are coupled via the computer network (110). The dashed double arrows represent network connections that can be offline for certain period during normal activities of the traveler (101), for example during the trip when the traveler (101) is traveling through a region without any access to the computer network (110). In addition, the traveler content source (102) includes the personal content source (102a) and the online content server (102b), which are computing devices with data storage. While the online content server (102b) is generally connected to the computer network (110) during normal operation, the personal content source (102a) may be a stand-alone device that requires manual intervention to connect to the computer network (110). For example, the personal content source (102a) may reside on a camera or camcorder that may not be network-ready. In one or more embodiments, the online content server (102b) may host one or more website where online multimedia content, online social network content, online news content, e-commerce content, email content, etc. may be accessed by the traveler (101). In one or more embodiments, the traveler content includes the personal content, online multimedia content, online social network content, online news content, e-commerce content, email content, etc. accessible from the traveler content sources (102). Throughout this disclosure, the term "trip" refers to activities associated with traveling from a starting location to a destination onboard a vehicle. In particular, the trip may include multiple legs using different types of vehicles for different legs. Each leg of the trip has a departure port and a destination port of the vehicle. The ports associated with transit legs (i.e., neither the first leg nor the last leg of the trip) are referred to as transit ports. Throughout this disclosure, the term "vehicle" may refer to any of an aircraft, a marine craft, or a land-based vehicle; the term port may refer to any of an airport, a harbor, or a land-based vehicle station.

Further as shown in FIG. 1.1, the system (100) includes a vehicle (105) coupled to the ports (e.g., port caching server (104)) one at a time as these ports are traversed by the vehicle (105) boarded by the traveler (101) during the trip. In one or more embodiments, the traveler content service computer system (106) includes traveler content service repository (123) and the traveler content service manager (124). The computer network (110) may include wired and/or wireless portions of the Internet and/or other data communications networks such as wide area networks (WANs), local area networks (LANs), etc. Although only one traveler, one online content server, and one port caching server, and one vehicle are shown in FIG. 1.1, multiple travelers may board a single vehicle, multiple online content servers may host portions of the traveler content, multiple port caching servers may exist throughout the ports traversed by the traveler onboard the vehicle during the trip, and multiple vehicles may be boarded by the traveler through different legs of the trip. Further, the traveler content service computer system (123) may have a distributed architecture. For example, copies of the traveler content service manager (124) may execute on multiple computers located throughout the ports traversed during the trip, and the traveler content service repository (123) may include multiple storage devices located throughout these ports.

In one or more embodiments, the traveler content service manager (124) is a computer program executing on a processor of the traveler content computer system (106) and include the traveler content ordering module (124a) and the pre-boarding module (124b). In one or more embodiments, the traveler content ordering module (124a) is configured to receive, from the traveler (101) and prior to the trip, a request to access traveler content (e.g., data content stored in the traveler data sources (102)) during the trip. In particular, the request includes travel ticket information associated with the trip and access information to the traveler data sources (102). For example, the travel ticket information may be initially provided by the travel ticketing server (103) and later revised during the trip, as initiated by the traveler (101) or the travel operator operating the vehicle (105). The travel ticket information is stored in the traveler content service repository (123) as the travel ticket information (123d). In one or more embodiments, different types of traveler content from different sources may be selected by the traveler (101) using a selection menu presented by the traveler content ordering module (124a). Using this selection menu, the traveler (101) may specify one or more websites hosting online multimedia content, online social network content, online news content, e-commerce content, email content, and/or other online content where he/she desires to have access during the trip. In one or more embodiments, a service fee is calculated and presented to the traveler (101) for acceptance. Once accepted, the traveler content ordering module (124a) completes the order to initiate subsequent processing by the pre-boarding module (124b).

In one or more embodiments, the pre-boarding module (124b) is configured to retrieve, prior to the trip, the traveler content from the traveler content sources (102) using the access information provide by the traveler (101). For example, the personal content source (102a) may be hooked up by the traveler (101) to the computer network (110) to upload personal content to the traveler content service repository (123). The uploaded personal content is identified as the pre-loaded personal content (123b) stored as part of the traveler content (123a). In another example, online content may be crawled and retrieved from the online content server (102b) specified by the traveler (101) using the traveler content ordering module (124a). This retrieved content is uploaded to the traveler content service repository (123) as part of the traveler content (123a) and identified as the pre-ordered online content (123c).

In one or more embodiments, the pre-boarding module (124b) is further configured to transmit, in response to detecting a vehicle (e.g., vehicle (105)) assigned to the trip at a port of the trip, the traveler content (123a) to the vehicle (e.g., vehicle (105)). In one or more embodiments, the traveler content (123a) is stored in a caching server (e.g., the port caching server (104)) of the port as the traveler content port copy before relayed to the vehicle (e.g., vehicle (105)). A copy of the traveler content (123a) (e.g., depicted as the traveler content onboard copy (133a) in FIG. 1.2 described below) is then generated and stored in the traveler content repository (e.g., depicted as the traveler content repository (133) in FIG. 1.2 described below) of the vehicle (e.g., vehicle (105)). In response to detecting that the traveler (101) has departed onboard the vehicle (e.g., vehicle (105)), the traveler content port copy is then deleted from the caching server of the port (e.g., the port caching server (104)). In one or more embodiments, the travel ticket information (123c) is also stored in the traveler content repository (133) onboard the vehicle (105), for example by the pre-boarding module (124b).

FIG. 1.2 shows a schematic diagram of the vehicle (105) in accordance with one or more embodiments of the invention. As shown in FIG. 1.2, the traveler (101) has boarded the vehicle (105) for the trip. In one or more embodiments, the vehicle (105) includes the onboard computer system (116) that includes the onboard content manager (134) executing on a processor of the onboard computer system (116). The onboard content manager (134) is configured to provide, during the trip, the traveler content onboard copy (133a) from the traveler content repository (133) to the traveler (101). In particular, the traveler content onboard copy (133a) initially includes the same content (i.e., pre-loaded personal content (123b), pre-ordered online content (123c)) as the traveler content (123a) depicted in FIG. 1.1. During the trip onboard the vehicle (105), the traveler (101) may update or revise the traveler content onboard copy (133a) and/or the travel ticket information (123c). For example, the traveler (101) may revise a calendar and alters the personal content, edit a photo and alters the online multimedia content, post a message and alters the online social network content, add a merchandise to the shopping cart and alters the e-commerce content, composed and email and alters the email content, etc. In another example, the traveler may change the trip itinerary and alters the travel ticket information (123c). In one or more embodiments, the onboard content manager (134) includes (a) the authentication module (134a) for authenticating the traveler (101) to access only those content that he ordered initially, (b) the caching interface (134b) to allow the traveler (101) to access the traveler content onboard copy (133a) in the same manner as he/she would access the traveler content sources (102) when he/she is online prior to the trip, and (c) the courtesy service (134c) to allow the traveler (101) to access any free content provided onboard the vehicle (105) without any service charge.

In an example scenario, the vehicle (105) is an initial vehicle assigned to the trip with the travel content onboard copy (133a) referred to as a traveler content initial onboard copy, which is intended to be provided to the traveler (101) during the trip onboard the initial vehicle (105). However, in this example scenario, the traveler (101) missed the departure time of the vehicle (105). In one or more embodiments, the pre-boarding module (124b) is further configured to determine whether the traveler (101) has boarded the initial vehicle (105) in response to the initial vehicle (105) departing the departure port. If the pre-boarding module (124b) detects that the traveler (101) fails to board the initial vehicle (105) for departure, the traveler content initial onboard copy is deleted from the initial vehicle (105).

In another example scenario, the vehicle (105) is a replacement vehicle assigned to the trip based on a revised itinerary due to the traveler (101) missed the initially assigned vehicle. The travel content onboard copy (133a) is referred to as the travel content second onboard copy, which is to be provided to the traveler (101) during the trip onboard the replacement vehicle (105).

In another example scenario, the vehicle (105) is a transit vehicle assigned to a subsequent leg of the trip. The travel content onboard copy (133a) is referred to as the travel content second onboard copy, which is to be provided to the traveler (101) during the trip onboard the transit vehicle (105). In this scenario, the travel content second onboard copy is obtained from a previous vehicle (which may be a different type of vehicle than the transit vehicle) assigned to a previous leg of the trip where the traveler (101) transfers from this previous vehicle to the transit vehicle (105) at a transit port. In one or more embodiments, the travel content second onboard copy is relayed from a previous vehicle via a pre-boarding module and a port caching server located at the transit port, for example during a lay-over when the transit vehicle and the previous vehicle do not overlap each other at the transit port. In another example, the previous vehicle may be an aircraft and the transit vehicle may be a train where the transit port includes both an airport and a train station separate from each other. In this example, two pre-boarding modules, separately located at the airport and train station, may be used to relay the travel content second onboard copy via two port caching servers, also separately located at the airport and train station, to the train. From time to time, the travel content second onboard copy may include revisions to the initial traveler content (123a) made by the traveler (101) during the previous leg of the trip onboard the previous vehicle.

In yet another example scenario, a pre-boarding module located at the destination port of the trip detects the vehicle (105) arriving the destination port, the traveler content onboard copy (133a) from the traveler content repository (133) onboard the vehicle (105) is transferred to a destination accommodation of the trip for providing to the traveler (101) during his/her stay. In particular, this is useful when there is no access to the traveler content sources (102) from the destination accommodation.

Figure 2:
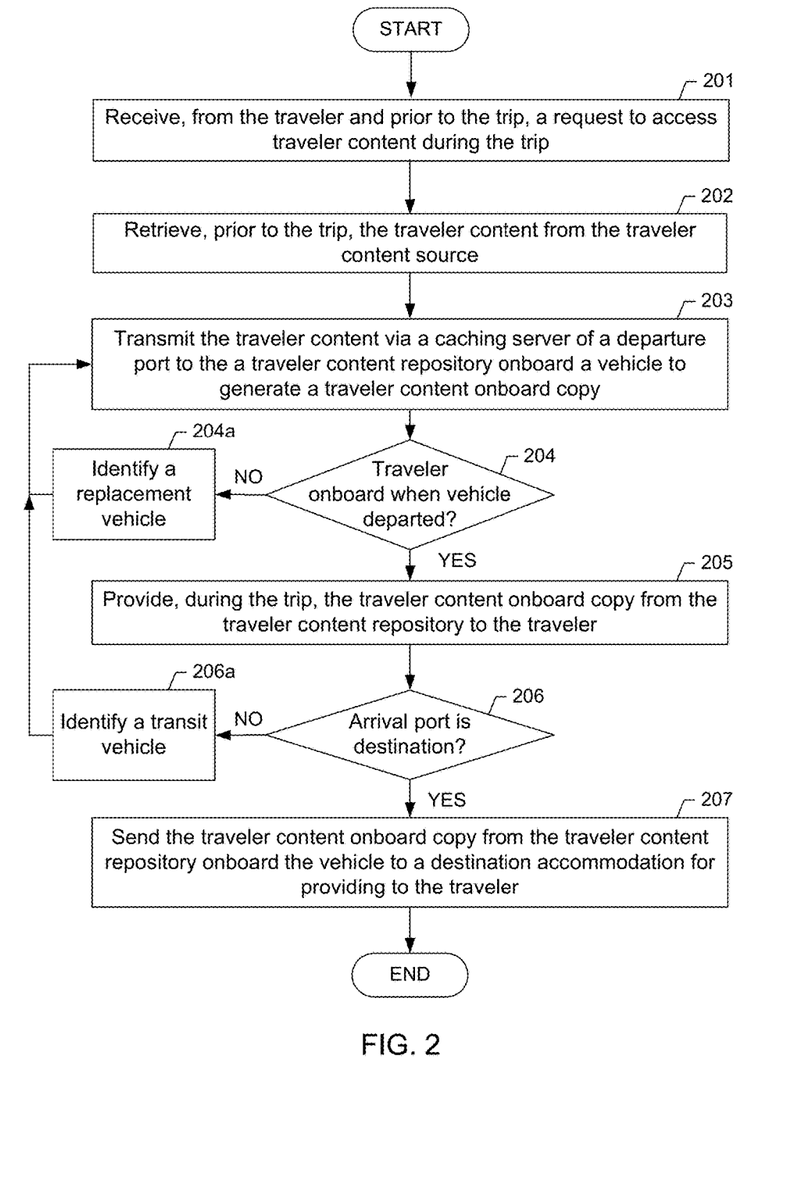
FIG. 2 shows a flowchart of a method according to aspects of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments of the invention, the method depicted in FIG. 2 may be practiced using system (100) described with respect to FIGS. 1.1 and 1.2 above.

Initially in Step 201, a request to access traveler content during a trip is received prior to the trip from the traveler. In particular, the trip crosses a region with no access to the source of the traveler content. In one or more embodiments, the request includes travel ticket information associated with the trip and access information to a source of the traveler content. For example, the travel ticket information may identify a vehicle for a particular leg of the trip, the departure port and arrival port of the vehicle for the particular leg, departure/arrival schedule and gate information, etc. In addition, the access information to the traveler content source may identify a type of the source and any required login information. For example, the type may indicate that the traveler content source may be offline and coordination with the traveler is required to upload the traveler content. In another example, the type may indicate that it is a website and login information is required to retrieve the traveler content.

In Step 202 the traveler content is retrieved, prior to the trip, from the traveler content source using the access information. For example, the traveler content is retrieved automatically from a user specified online source, such as a news site, an online social network site, etc. In another example, the traveler content may be offline and the traveler is contacted to coordinate the upload.

In Step 203 in response to the retrieving in Step 202, the traveler content is transmitted to the vehicle. In one or more embodiments, the traveler content is first stored in a caching server of the departure port of the vehicle, referred to as a traveler content departure port copy. This may be performed hours or days prior to the scheduled departure time. Subsequently, the traveler content departure port copy is sent from the caching server of the departure port to a traveler content repository onboard the vehicle when the vehicle arrives at the departure port for the scheduled departure. The traveler content stored in the traveler content repository onboard the vehicle is referred to as the traveler content onboard copy. In one or more embodiments, the traveler content departure port copy may be updated at the departure port prior to be stored as the traveler content onboard copy. For example, the traveler content initially retrieved from a news site may be updated with breaking news.

In Step 204, in response to the vehicle departing the departure port, a determination is made as to whether the traveler has boarded the vehicle. If the determination is yes, the traveler content departure port copy may then be deleted and the method proceeds to Step 205. If the determination is no that the traveler has failed to board the vehicle prior to the vehicle departing (e.g., he/she missed the flight, missed the train, etc.), the replacement vehicle is identified (Step 204a) and the method returns to Step 203. For example, the traveler may revised the itinerary to replace the initial vehicle he/she missed by a replacement vehicle to resume the trip. The Step 203 is then performed one more time for the replacement vehicle. In one or more embodiments, the traveler content onboard copy is deleted from the traveler content repository onboard the initial vehicle.

In Step 205 during the trip, the traveler content onboard copy is provided by an onboard computer processor of the initial vehicle or the replacement vehicle from the onboard traveler content repository to the traveler.

In Step 206, when the vehicle (e.g., the initial vehicle, replacement vehicle, or any transit vehicle used for a subsequent leg of the trip) arriving an arrival port, a determination is made as to whether the arrival port is the destination of the trip. If the determination is yes, the method proceeds to Step 207. If the determination is no that the arrival port is a transit port, the vehicle (referred to as the transit vehicle) assigned to the next leg of the trip is identified and the method returns to Step 203. The Step 203 is then performed one more time for the transit vehicle. In one or more embodiments, the traveler content onboard copy is deleted from the traveler content repository onboard the vehicle of the previous leg of the trip.

In Step 207 the traveler content onboard copy is sent from the traveler content repository onboard the vehicle to another traveler content repository located at a destination accommodation of the trip. In particular, there is no access to at least a portion of the traveler content source from the destination accommodation. The traveler content stored in this another traveler content repository is referred to as the traveler content destination copy. In one or more embodiments, the traveler content onboard copy may be updated at the destination port (e.g., via a pre-boarding module and a caching server) prior to be stored as the traveler content destination copy. For example, the traveler content initially retrieved from a news site may be updated with breaking news. Accordingly, the traveler content destination copy is provided to the traveler while the traveler stays at the destination accommodation.

FIGS. 3.1-3.2 show an example for the traveler content service in accordance with one or more embodiments of the invention. In particular, the example is based on the system diagram and the method flow chart shown in FIGS. 1.1 through FIG. 2 above.

Cloud computing is the use of computing resources (hardware and software) that are delivered as a service over a network (typically the Internet). The term "cloud" refers to these computing resources and the network used in cloud computing applications.

Figure 31:
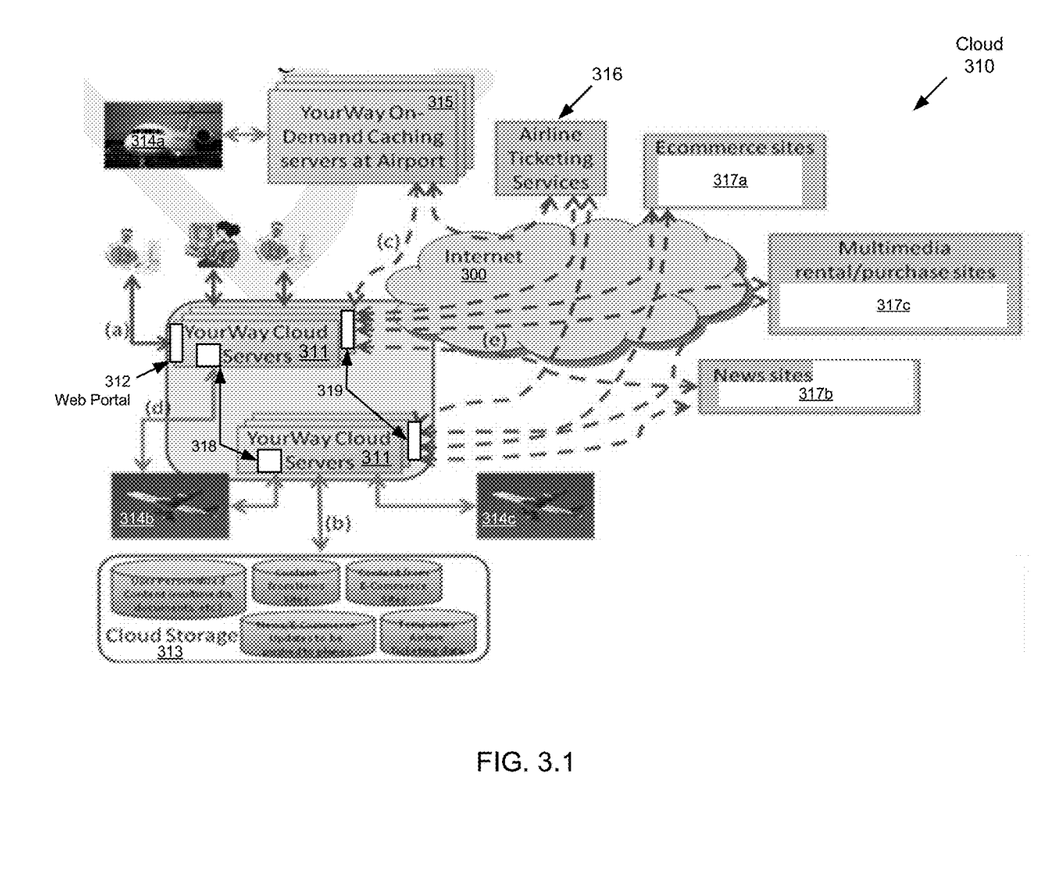

FIG. 3.1 shows the cloud infrastructure (referred to as cloud (310)) of the example traveler content service (referred to as YourWay). As shown, the cloud (310) consists of several clusters of servers (referred to as YourWay cloud servers (311) that may be located at one or more geographical locations) and the Internet (300) to provide the functionality/services described below.

(a) Web Portal (312). This is the web service that will allow passengers (i.e., travelers) to log into YourWay web site (i.e., the traveler content service website) through a browser and personalize the content they want to take with during their travel. Passengers typically do this before their travel begins.

(b) Cloud Storage (313). The cloud storage (313) stores all the personal content uploaded by the passengers. It will also store the data (including periodic updates) regarding partner news sites and e-commerce sites. Finally, the cloud storage (313) also contains temporary airline ticketing data regarding passengers so that YourWay can figure out the airport and the flight number that is associated with them in an automated fashion and push their content to the corresponding plane (e.g., airplane (314a)).

(c) YourWay On-demand Caching Servers (315). This is the content server for airport gateways. The cloud infrastructure also answers all the queries received from the airport gateways regarding the content that needs to be transferred to the servers onboard an airplane (e.g., airplane (314a)). The airport gateways will interface with the airline ticketing services (316) at the airports and can request the following information from the cloud infrastructure: (i) All the data and history for a particular passenger who checked into a particular flight at the airport. The history can be the passenger activity on the YourWay web portal (312) or their activity on the YourWay supported sites, such as social network and/or multimedia rental/purchase websites (317c). (ii) All the transit information of passengers so that they can be rerouted in case the flight gets delayed. (iii) All the news websites (317b) and e-commerce websites (317a) that require to be cached on a particular plane (e.g., airplane (314a)). Note that the content that will be cached on each plane will be different and customized based on the origin and destination cities. For example, a flight from San Francisco to New York will mostly contain news sites that cater to the U.S. public. However a flight from New York to New Delhi will contain news sites from both U.S. and India.

(d) Proxy Server and Optimizer (318). This service serves the requests coming from the machines on a plane (e.g., airplane 314b, 314c, etc.) en-route to its destination. It acts as a proxy to fetch the content from the corresponding servers (e.g., one or more of the servers in the server clusters (311)) on the web, compress and schedule the delivery of the response to be sent back in the optimal way to the plane (e.g., airplane 314b, 314c, etc.).) en-route to its destination. These requests can originate from the servers onboard the plane (like news updates) or from the passengers (like social network updates). These requests and/or the corresponding delivery of the responses may occur when the airplane is in the air, at a transit airport, or at the destination airport.

(e) Synchronization and Mirroring Server (319). The main functionality of this server is to crawl all the YourWay supported sites (e.g., 317a, 317b, 317c, etc.) and store them so that they can be cached on the onboard plane servers. These servers crawl all the supported sites (including the sites requested by the passengers before they board the plane) and store the content on the cloud storage (313).

Figure 32:
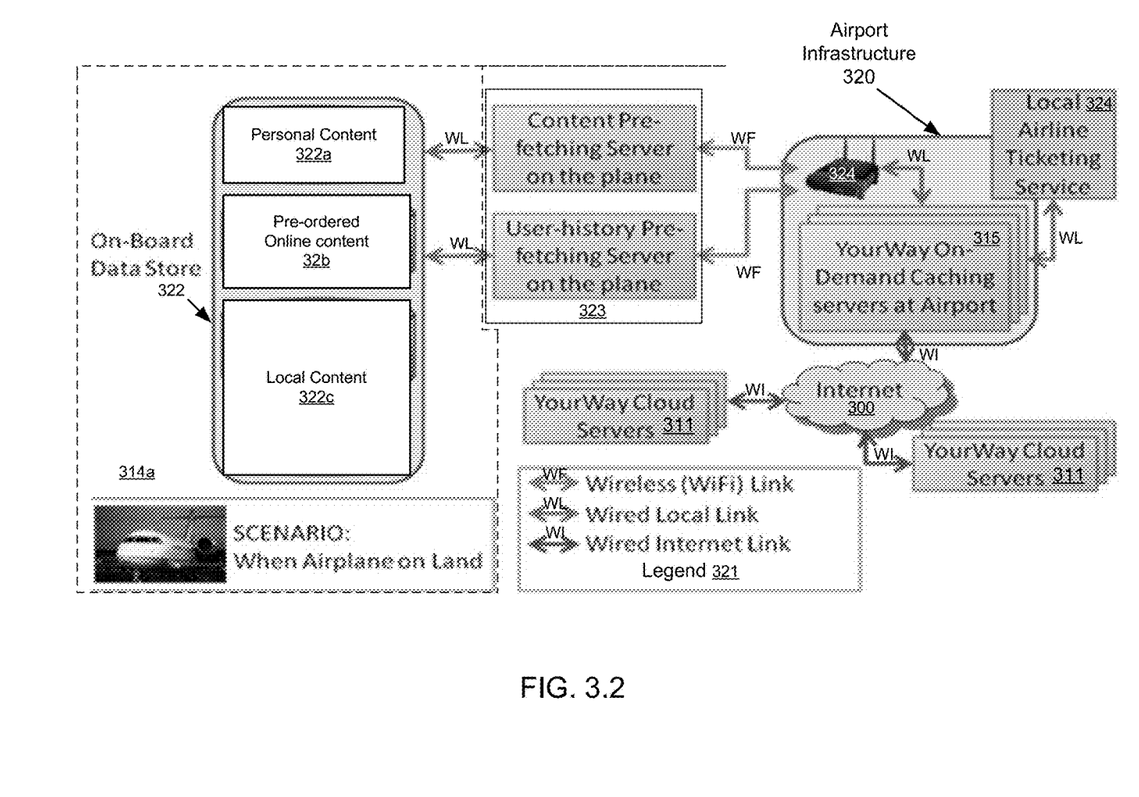

FIG. 3.2 shows the airport infrastructure (320), which is an important part of the YourWay architecture. As shown, the airplane (314a) is on the ground in communication with the airport infrastructure (320). The communication may be provided via various wired/wireless links identified according to the legend (321). The main goal is to ensure that the processing load for a particular airport is handled by the infrastructure (320) located at the airport. This will reduce the burden both on the onboard plane servers (323) and the cloud infrastructure. In some example, YourWay can function without this infrastructure (320). In other words, the onboard servers (323) on the plane (314a) can directly talk to the cloud servers (311) to cache the required content. The airport infrastructure (320) includes two main components—wireless access points (324) and on-demand caching servers (315). This infrastructure (320) will support the functionality/services described below.

(a) Wireless Access for Onboard Servers. When an airplane (314a) is parked at a gate in the airport, the servers (323) onboard the airplane (314a) need to cache the required content for the passengers who will board the flight. The wireless connection required for this data transfer is enabled by installing several wireless access points (324) in the airport. These access points (324) are connected to the on-demand caching servers (315) in the airport through high speed optical cables.

(b) Interfacing with the Airline Ticketing Service. The on-demand caching servers (315) interface with the local airline ticketing service (324) to identify the passengers and their respective flights. This is a critical functionality that will enable the correct content to reach the correct onboard servers (e.g., server (323)).

(c) Caching the content required for the passengers at the airport. Once the local ticketing service (324) informs the on-demand caching servers (315) that a particular passenger has checked into a particular flight, the on-demand caching servers (315) will request the cloud infrastructure (310) to provide all the personal content (322a) for the passenger. It will cache the content until it is successfully transferred to the onboard servers (323) on the airplane (314a). Pre-ordered online content (322b) such as news and e-commerce data from YourWay supported sites will be constantly updated on the on-demand caching servers (315). The latest snapshot of the content will be pushed to the onboard servers (315) before the flight (i.e., airplane (314a)) takes-off. Local content (322c) may include in-cabin chat content or other premium content downloaded from the cabin.

(d) Delivering the content required by onboard plane servers. The on-demand caching servers (315) will deliver the content (personalized content of passengers along with the other content from news and e-commerce sites) to the onboard servers (323) on the airplane (314a) before the flight takes off. It is the responsibility of the on-demand caching server (315) to push the right content to the onboard servers (323) on the airplane (314a).

Figure 33:
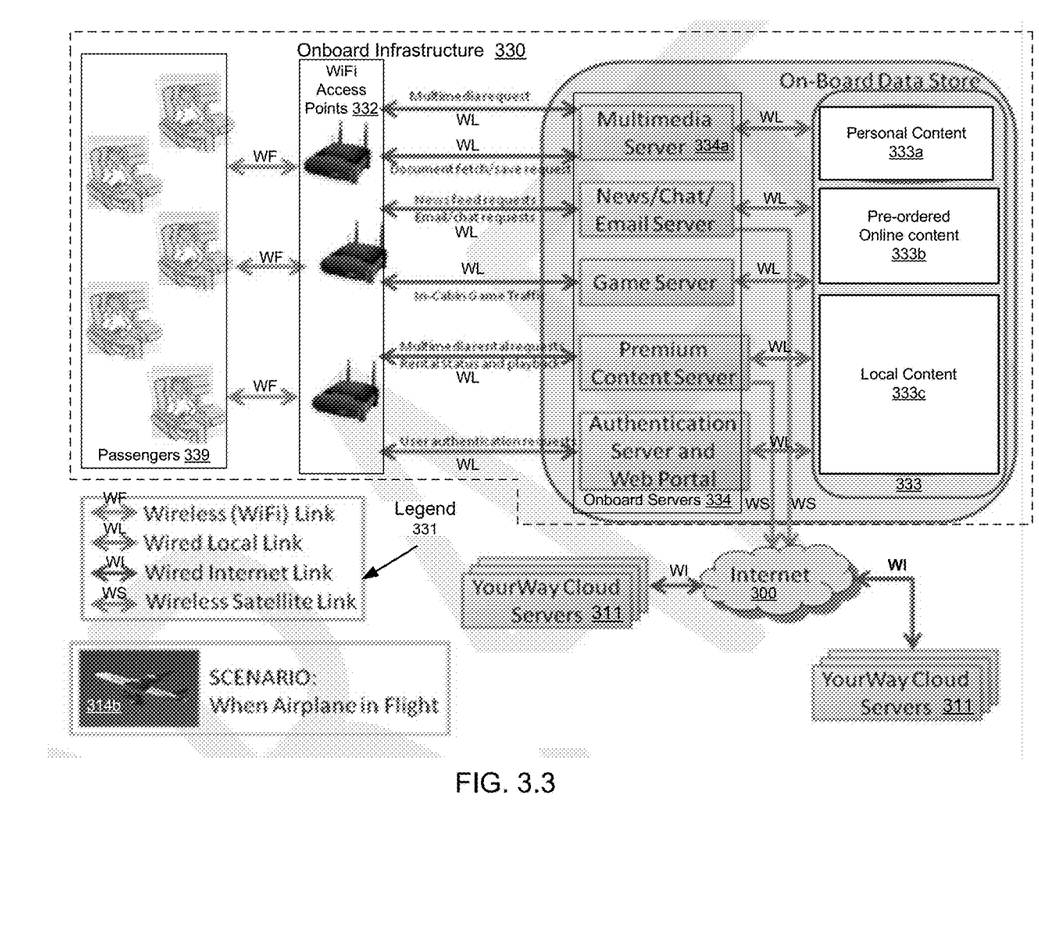

FIG. 3.3 shows the onboard infrastructure (330), for example onboard the airplane (314b) in flight. In order to provide access to the all content that the passengers (339) desire, most (if not all) of the content should reside close to each of the passenger (339) on the airplane (314b). The onboard infrastructure (330) not only contains large onboard data storage (333) to cache all the required content (e.g., personal content (333a), pre-ordered online content (333b), and local content (333c)) and WiFi access points (332) to enable the passengers (339) to access the cached content, but also contains a number of physical onboard servers (334) that will provide the required functionality to the passengers (339). Any of the passengers (339) will have a choice of how he/she wants to access the YourWay service from their seats—either through their seat-mounted screens or a personal WiFi enabled device (such as a tablet, phone, or laptop computer). Once connected, the passengers (339) can take advantage of the following services/functionalities described below via various wired/wireless links identified according to the legend (331).

(a) Preloaded Multimedia Content. A passenger (e.g., any of the passengers (339)) can upload his/her personal multimedia content (e.g., part of the personal content (333a)) to watch during the flight through the YourWay cloud infrastructure (i.e., cloud (310) depicted in FIG. 3.1) before he/she embarks on the journey. This content will be stored on the flight servers (e.g., onboard servers (334)) onboard his/her flight for easy access. Once logged into the YourWay service, the passenger will be able to locally access his/her multimedia content, for example from the multimedia server (334a). Access to a passenger's personalized multimedia will create an environment that the passenger will enjoy, thus making his/her trip more pleasurable.

(b) Personal Document Edit/Save. A passenger can also upload the documents (in MS Word, Powerpoint, Excel, Keynote, Numbers, PDF, etc. as part of the personal content (333a)) that he/she prefers to access on the flight. These documents will be available for the passenger on the flight to edit and save. The saved documents will be pushed to the YourWay cloud (310) and will be accessible to the passenger in any leg of the flight or when they reach their final destination. This capability will help a passenger to either avoid carrying a laptop onto the airplane or to avoid the need to use the laptop in the carry-on luggage in the congested airplane cabin.

(c) Check Emails, post OSN (online social network) updates, and receive OSN Feeds. Passenger can also access their favorite OSN sites (e.g., cached as pre-ordered online content (333b)) through the YourWay interface. They will be able to post updates and receive feeds in real-time, for example via an onboard wireless satellite link by paying a premium service fee. Access to these sites through the YourWay service will help save network bandwidth, an expensive and scarce resource on the plane.

(d) Quasi-Real-Time News from popular news sites. Passengers will also be able to access several popular news sites (e.g., cached as pre-ordered online content (333b)) using the YouWay service. They will also get near real-time updates regarding breaking news, for example via an onboard wireless satellite link by paying a premium service fee. In addition, if passengers express interest in reading news sites that were not part of the popular listing in YourWay before their travel starts, then YourWay will be able to provide news from these sites to the passenger during the flight. These news sites will also receive near real-time updates.

(e) Play Games or Chat with Fellow Passengers. All passengers will be able to play several single-player and multi-player games that are hosted on the onboard servers (334). In addition, they will also be able to chat with their fellow passengers seated anywhere in the airplane. Data generated from these activities is stored as local content (333c).

(d) Shop on popular e-commerce sites. All passengers will be able to shop on several popular e-commerce sites (e.g., cached as pre-ordered online content (333b) and/or updated via the satellite link as transaction batches) while they are flying. These stores will have prices comparable to what they can find when they are at home. This will encourage more and more people to shop when flying. An agreement with a few popular e-commerce sites will help the operator of YourWay to monetize these transactions.

(f) Rent/purchase multimedia content. Although YourWay gives passengers an opportunity to upload their own multimedia to the YourWay cloud (310) before they begin their travel, some passengers might want to rent or buy multimedia while they are on the flight. Although this will come at a premium price, YourWay will enable a passenger to rent/buy multimedia through its own interface. This multimedia will be streamed directly to the airplane (e.g., stored as local content (333c)) via the satellite link and will be available to the passenger after a certain time interval. The passenger can choose to watch this on the current leg of the flight or the following legs. He/she can even decide to watch this when they reach their destination.

(g) Change connecting flights through YourWay e-ticketing service. Finally, the YourWay service also allows passengers to change their connecting flight through the onboard YourWay e-ticketing service. A passenger who is running late and is bound to miss his/her connection can use this functionality to find the ideal connection. The passenger can change his/her flight reservation and get a confirmation right at his/her seat. This will save the hassle of running to the airline ticketing counters to find the next connecting flight.

Based on the example system described above to provide the YourWay service, an example traveler experience is described below regarding Alice, 17 years old and English speaking, throughout her entire first international trip, from San Francisco, USA to Palermo (Sicily), Italy. Alice will be accompanied by her best friend Kristy, 22 years old and English speaking as well. They both are very excited about their upcoming international vacation but at the same time a bit stressed out because it will be the first time for both to fly international. Alice heard good things from her friends about this novel travel support system called YourWay and decided to subscribe to it. Conversely, Kristy did not. They started planning the details of their trip together a few weeks before, searching for the best trip deals, online itineraries, accommodations. The worst seemed to be passed and are both enjoying a movie on their couch at Alice's place all geared up for the upcoming trip the next day. Alice realizes that the flight will last very long hours (26 hours with 3 flight connections). She takes her tablet computer, clicks on the YourWay service and she uploads the multimedia content she could use to kill some time during her trip (using media content section of YourWay web portal). She uploads the last ten episodes of "Sex and the City" (that she recorded and never watched), three movies (DVDs) she received as presents (that she never watched), a couple of e-books and her entire personal media player music discography. Alice then decided she completely forgot to buy the last issues of her preferred newspapers "Teen Vogue" and "Teen Magazine"; it is late in the evening and her flight will leave SFO very early in the morning. Alice clicks on the YourWay news section and submit the request to have both newspapers ready at the SFO departure gate for her. One click and done! She gets more and more fascinated about this service. She enters the E-Sites section of YourWay portal and realizes she can subscribe to MySpace©, Facebook© and Twitter© to be in touch with her family and friends and post updates on every tiny details of her trip she would like to share. Next click and she lands in the food & drink section of YourWay web portal. Spends a good time in searching through the myriad of different meals she could order. The cool aspect is that the system presents different options for the three different flights she will be boarding as if it knew whether it will time for a good American breakfast, or brunch, lunch, dinner or snack. After many thoughts, she makes her selection the traveler content selection menu offered by the YouWay web portal and submits her order through! It is past 10:00 pm and time to go and catch some sleep. A long day is ahead for both Alice and Kristy.

Alice and Kristy leave their place by rushing out the door, take a taxi-cab and head to the airport. While at the airport they rush to check-in their luggage, go through security and finally reach their gates. Alice goes and ask the people at the counter to pick up her newspapers . . . and there they are with a nice note "Alice, enjoy your vacation and your trip—the YourWay team!" She is so excited! Kristy starts wondering what has just happened and start paying attention to the new service used by Alice. They board the plane and take off. After 30 minutes, Kristy takes her laptop and starts watching movie she downloaded the day before. Alice clicks the YourWay logo on the seat screen and all content is there at her fingertip. She starts by watching a movie, then takes a short video of the plane surfing the clouds and shares it on her Facebook© account, and the fun keeps coming! After a few hours, it is time for the first meal to be served. Kristy has to pack back her laptop (10% battery left and still 18 hours to kill). Alice enjoys the good American breakfast she ordered while continuing to watch her movie. Kristy is fascinated about the new service and she starts asking questions about it.

After 6 hours of flight, the plane safely lands at New York, USA JFK airport. Alice and Kristy have three hours of time before the next flight. They enjoy a cup of coffee waiting at the departure gate of their next flight. Kristy is a bit annoyed while Alice continues to watch the movie she started while on the plane (using her tablet computer to access the YourWay cloud service). Time to board again, this time on a plane heading to Rome, Italy, Fiumicino airport. After 4 hours on the plane, Alice realizes that Kristy is feeling a little bit down—stressed and definitely tired. It should not be because it is Kristy's birthday. Alice accesses YourWay again, go to the shopping section and checks on duty-free merchandise that could be picked up while landing at the airport in Rome. Alice wants to surprises Kristy—it is their dream vacation after all! She finds a beautiful woman pursue—place the order for it and requests for a pick up at the landing gate. In just two hours, Alice will surprise Kristy with her Italian present. Unfortunately, the captain announces that the flight will suffer a 1 hour and 20 minutes of delay for bad weather conditions in Rome. This is bad as it will likely they will miss their connection flight in Rome to their final destination. Kristy is panicking and the stress mounts up on top of just too many hours on a plane. While Alice is trying to calm down Kristy, YourWay prompts Alice with a warning message about the likelihood for Alice to miss her connection flight in Rome and presents to Alice a few options she may choose from. In a few minutes, Alice receives her new e-ticket for the next flight to Palermo, instructions to the departure gate and confirmation that her luggage will be boarded on the new booked flight. The plane lands in Rome and while the poor tired Kristy is trying to get her problem resolved, Alice switched her mobile phone to WiFi mode, connected to the YourWay wireless network and enjoying a video-call conversation with her parents back in USA.

Figure 4:
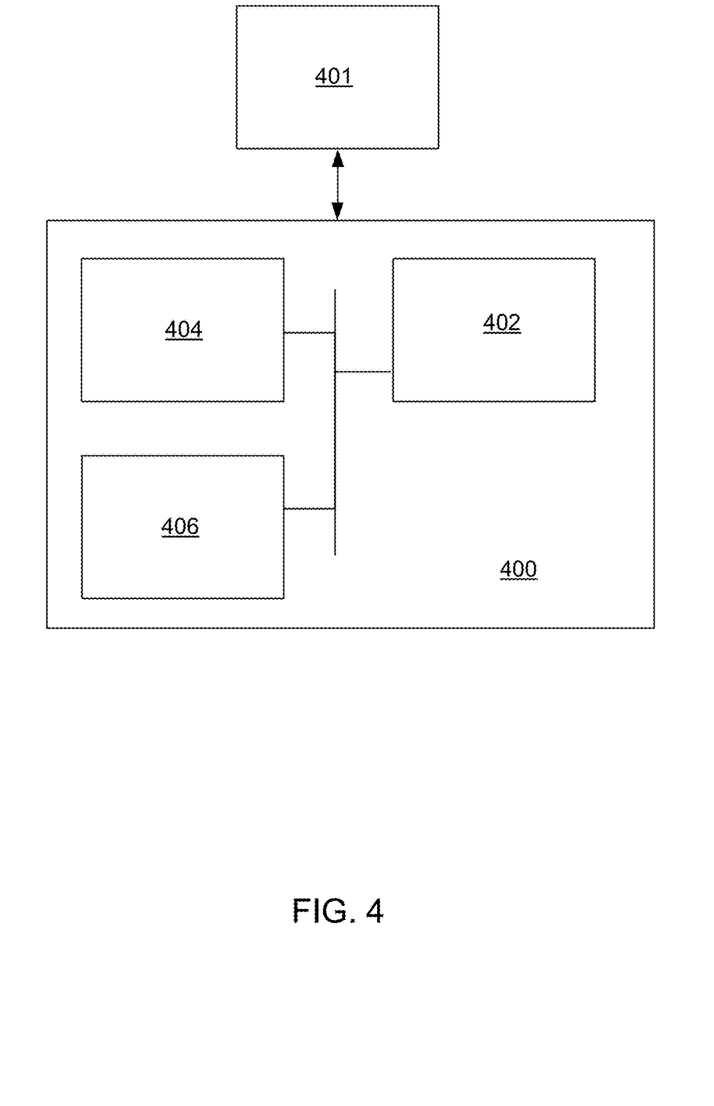
FIG. 4 shows a computer system according to aspects of the invention.

Embodiments of the invention may be implemented on virtually any type of computer regardless of the platform being used. For example, as shown in FIG. 4, a computer system (400) includes one or more processor(s) (402), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor) for example to display various results such as the feature vectors, the principal components, the application space, the signatures, etc. The computer system (400) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to provide traveler content service during a trip of a traveler, comprising:
    receiving, by a computer processor in an airport infrastructure from the traveler and prior to the trip, a request to access traveler content during the trip, wherein the request comprises travel ticket information obtained via interfacing with a local airline ticketing service associated with the trip and access information to a source of the traveler content, the source of the traveler content including a personal content source and an online content server, wherein the trip crosses a region with no access to the source of the traveler content, wherein the trip comprises an initial portion and a transit portion;
    retrieving, by the computer processor prior to the trip, the traveler content from the source using the access information;
    uploading the traveler content to a cloud storage, the cloud storage being accessible by a plurality of wireless access points in the airport;
    automatically detecting, by a pre-boarding module, a first vehicle assigned to the initial portion of the trip;
    transmitting, by the computer processor in response to detecting the first vehicle assigned to the initial portion of the trip at a departure port of the trip, the traveler content to a first traveler content repository onboard the first vehicle to generate a traveler content first onboard copy, the first vehicle being in direct communication with the airport infrastructure via the plurality of wireless access points in the airport, wherein transmitting includes storing, in response to the retrieving, the traveler content in a caching server of the departure port to generate a traveler content departure port copy, the caching server being in direct communication with a local airline ticketing service to enable the correct content to reach a correct onboard server, and wherein the caching server is connected to the plurality of wireless access points via high speed optical cables;
    sending the traveler content departure port copy from the caching server of the departure port to the first traveler content repository onboard the first vehicle to generate the traveler content first onboard copy;
    after the first vehicle departs the departure port, determining by the computer processor via the pre-boarding module, whether the traveler has boarded the first vehicle;
    if the traveler has not boarded the first vehicle, deleting the traveler content first onboard copy from the first vehicle and identifying a replacement vehicle and transmitting the traveler content departure port copy from the caching server of the departure port to a replacement traveler content repository onboard the replacement vehicle to generate a traveler content replacement onboard copy;
    if the traveler has boarded the first vehicle, providing, during the initial portion of the trip and by an onboard computer processor of the first vehicle, the traveler content first onboard copy from the first traveler content repository to the traveler transferring, by the computer processor subsequent to the first vehicle departing the departure port and in response to detecting the first vehicle at a transit port of the trip, the traveler content by:
    sending the traveler content first onboard copy from the first traveler content repository onboard the first vehicle to a second traveler content repository onboard a second vehicle to generate a traveler content second onboard copy, wherein the second vehicle is assigned to the transit portion of the trip at the transit port of the trip, wherein the traveler transfers from the first vehicle to the second vehicle at the transit port; and
    deleting, without user intervention from the traveler, the traveler content first onboard copy from the first traveler content repository onboard the first vehicle;
    providing, during the transit portion of the trip, the traveler content second onboard copy from the second traveler content repository to the traveler;
    determining at an arrival port whether the arrival port is the destination of the trip;
    if it is determined that the arrival port is the destination of the trip, transmitting a destination copy of the first onboard copy from the first traveler content repository onboard the first vehicle to a third traveler content repository at a destination accommodation of the trip; and
    providing the destination copy to the traveler at the destination accommodation,
    wherein each port includes a corresponding airport infrastructure and wherein each airport infrastructure is configured to handle the processing load at each port such that the processing burden for onboard servers is reduced,
    wherein providing the traveler content to the traveler on any vehicle includes providing the traveler content via seat-mounted screens, wherein while onboard the vehicles, the traveler content is updated in real-time via a satellite link.

2. The method of claim 1, where the transmitting comprises:
deleting, in response to detecting that the traveler has departed onboard the first vehicle, the traveler content departure port copy from the caching server of the departure port.

3. The method of claim 1, further comprising:
transmitting, in response to detecting an initial vehicle assigned to the trip at the departure port of the trip, the traveler content to an initial traveler content repository onboard the initial vehicle to generate an traveler content initial onboard copy, wherein the traveler content initial onboard copy is intended to be provided to the traveler during the trip onboard the initial vehicle; and
determining, in response to the initial vehicle departing the departure port, whether the traveler has boarded the initial vehicle, wherein transmitting the traveler content to the first traveler content repository is in response to detecting the traveler failing to board the initial vehicle for departure, and wherein the first vehicle is assigned to the trip based on a revised itinerary of the trip due to the traveler failing to board the initial vehicle for departure.

4. The method of claim 1, further comprising:
deleting, in response to detecting the traveler completing a portion of the trip assigned to the first vehicle, the traveler content first onboard copy from the first traveler content repository onboard the first vehicle.

5. The method of claim 1, wherein there is no access to the source of the traveler content from the destination accommodation.

6. The method of claim 1,
wherein the vehicle comprises at least one selected from a group consisting of an aircraft, a marine craft, and a land-based vehicle, and wherein the traveler content comprises at least one selected from a group consisting of personal content, online multimedia content, online social network content, online news content, e-commerce content, and email content.

7. A system for providing traveler content service during a trip of a traveler, comprising:
a source of the traveler content, comprising a computer server, a personal content source, an online content server, and a repository;
a traveler content computer system in an airport infrastructure comprising:
a traveler content service manager executing on a processor of the traveler content computer system and comprising:
a traveler content ordering module configured to:
receive, from the traveler and prior to the trip, a request to access traveler content during the trip, wherein the request comprises travel ticket information obtained via interfacing with a local airline ticketing service associated with the trip and access information to a source of the traveler content, wherein the trip crosses a region with no access to the source of the traveler content, wherein the trip comprises an initial portion and a transit portion;
a preboarding module configured to:
retrieve, prior to the trip, the traveler content from the source using the access information;
upload the traveler content to a cloud storage, the cloud storage being accessible by a plurality of wireless access points in the airport;
automatically detect a first vehicle assigned to the initial portion of the trip; and
transmit, in response to detecting the first vehicle assigned to the initial portion of the trip at a departure port of the trip, the traveler content to a first traveler content repository onboard the first vehicle to generate a traveler content first onboard copy, the first vehicle being in direct communication with the airport infrastructure via the plurality of wireless access points in the airport, wherein transmitting includes storing, in response to the retrieving, the traveler content in a caching server of the departure port to generate a traveler content departure port copy, the caching server being in direct communication with a local airline ticketing service to enable the correct content to reach a correct onboard server, and wherein the caching server is connected to the plurality of wireless access points via high speed optical cables;
determine whether the traveler has boarded the first vehicle;
if the traveler has not boarded the first vehicle, delete the traveler content first onboard copy from the first vehicle and identify a replacement vehicle and transmit the traveler content departure port copy from the caching server of the departure port to a replacement traveler content repository onboard the replacement vehicle to generate a traveler content replacement onboard copy;
if the traveler has boarded the first vehicle, transfer, subsequent to the first vehicle departing the departure port and in response to detecting the first vehicle at a transit port of the trip, the traveler content by:
sending the traveler content first onboard copy from the first traveler content repository onboard the first vehicle to a second traveler content repository onboard a second vehicle to generate a traveler content second onboard copy, wherein the second vehicle is assigned to the transit portion of the trip at the transit port of the trip, wherein the traveler transfers from the first vehicle to the second vehicle at the transit port; and
deleting without user intervention from the traveler, the traveler content first onboard copy from the first traveler content repository onboard the first vehicle;
a traveler content service repository configured to store a copy of the traveler content;
a first onboard computer system onboard the first vehicle and comprising:
an onboard content manager executing on a first onboard computer processor of the first vehicle and configured to:
provide, during the initial portion of the trip, the traveler content first onboard copy from the first traveler content repository to the traveler, the first traveler content repository configured to store the traveler content first onboard copy;
determine at an arrival port whether the arrival port is the destination of the trip;
if it is determined that the arrival port is the destination of the trip, transmit a destination copy of the first onboard copy from the first traveler content repository onboard the first vehicle to a third traveler content repository at a destination accommodation of the trip; and
a second onboard computer system onboard the second vehicle and comprising:
a second onboard computer processor configured to:

provide, during the transit portion of the trip, the traveler content second onboard copy from the second traveler content repository to the traveler, the second traveler content repository configured to store the traveler content second onboard copy, wherein each port includes a corresponding airport infrastructure and wherein each airport infrastructure is configured to handle the processing load at each port such that the processing burden for onboard servers is reduced, wherein providing the traveler content to the traveler on any vehicle includes providing the traveler content via seat-mounted screens, wherein while onboard the vehicles, the traveler content is updated in real-time via a satellite link.

8. The system of claim 7, further comprising a caching server at the departure port, where the transmitting comprises:

deleting, in response to detecting that the traveler has departed onboard the first vehicle, the traveler content departure port copy from the caching server of the departure port.

9. The system of claim 7, the pre-boarding module further configured to:

transmit, in response to detecting an initial vehicle assigned to the trip at the departure port of the trip, the traveler content to an initial traveler content repository onboard the initial vehicle to generate an traveler content initial onboard copy, wherein the traveler content initial onboard copy is intended to be provided to the traveler during the trip onboard the initial vehicle; and determine, in response to the initial vehicle departing the departure port, whether the traveler has boarded the initial vehicle, wherein transmitting the traveler content to the first traveler content repository is in response to detecting the traveler failing to board the initial vehicle for departure, and wherein the first vehicle is assigned to the trip based on a revised itinerary of the trip due to the traveler failing to board the initial vehicle for departure.

10. The system of claim 7, the pre-boarding module further configured to:

delete, in response to detecting the traveler completing a portion of the trip assigned to the first vehicle, the traveler content first onboard copy from the first traveler content repository onboard the first vehicle.

11. The system of claim 7, wherein there is no access to the source of the traveler content from the destination accommodation.

12. The system of claim 7, wherein the vehicle comprises at least one selected from a group consisting of an aircraft, a marine craft, and a land-based vehicle, and wherein the traveler content comprises at least one selected from a group consisting of personal content, online multimedia content, online social network content, online news content, e-commerce content, and email content.

13. A non-transitory computer readable medium embodying instructions for providing traveler content service during a trip of a traveler, the instructions when executed by a processor in an airport infrastructure comprising functionality for:

receiving, by a computer processor in an airport infrastructure from the traveler and prior to the trip, a request to access traveler content during the trip, wherein the request comprises travel ticket information obtained via interfacing with a local airline ticketing service associated with the trip and access information to a source of the traveler content, the source of the traveler content including a personal content source and an online content server, wherein the trip crosses a region with no access to the source of the traveler content, wherein the trip comprises an initial portion and a transit portion;

retrieving, by the computer processor prior to the trip, the traveler content from the source using the access information;

uploading the traveler content to a cloud storage, the cloud storage being accessible by a plurality of wireless access points in the airport;

automatically detecting, by a pre-boarding module, a first vehicle assigned to the initial portion of the trip;

transmitting, by the computer processor in response to detecting the first vehicle assigned to the initial portion of the trip at a departure port of the trip, the traveler content to a first traveler content repository onboard the first vehicle to generate a traveler content first onboard copy, the first vehicle being in direct communication with the airport infrastructure via the plurality of wireless access points in the airport, wherein transmitting includes storing, in response to the retrieving, the traveler content in a caching server of the departure port to generate a traveler content departure port copy, the caching server being in direct communication with a local airline ticketing service to enable the correct content to reach a correct onboard server, and wherein the caching server is connected to the plurality of wireless access points via high speed optical cables;

sending the traveler content departure port copy from the caching server of the departure port to the first traveler content repository onboard the first vehicle to generate the traveler content first onboard copy;

after the first vehicle departs the departure port, determining by the computer processor whether the traveler has boarded the first vehicle;

if the traveler has not boarded the first vehicle, deleting the traveler content first onboard copy from the first vehicle and identifying a replacement vehicle and transmitting the traveler content departure port copy from the caching server of the departure port to a replacement traveler content repository onboard the replacement vehicle to generate a traveler content replacement onboard copy;

if the traveler has boarded the first vehicle, providing, during the initial portion of the trip and by an onboard computer processor of the first vehicle, the traveler content first onboard copy from the first traveler content repository to the traveler transferring, by the computer processor subsequent to the first vehicle departing the departure port and in response to detecting the first vehicle at a transit port of the trip, the traveler content by:

sending the traveler content first onboard copy from the first traveler content repository onboard the first vehicle to a second traveler content repository onboard a second vehicle to generate a traveler content second onboard copy, wherein the second vehicle is assigned to the transit portion of the trip at the transit port of the trip, wherein the traveler transfers from the first vehicle to the second vehicle at the transit port; and deleting, without user intervention from the traveler, the traveler content first onboard copy from the first traveler content repository onboard the first vehicle;

providing, during the transit portion of the trip, the traveler content second onboard copy from the second traveler content repository to the traveler;

determining at an arrival port whether the arrival port is the destination of the trip;

if it is determined that the arrival port is the destination of the trip, transmitting a destination copy of the first onboard copy from the first traveler content repository onboard the first vehicle to a third traveler content repository at a destination accommodation of the trip; and providing the destination copy to the traveler at the destination accommodation, wherein each port includes a corresponding airport infrastructure and wherein each airport infrastructure is configured to handle the processing load at each port such that the processing burden for onboard servers is reduced, wherein providing the traveler content to the traveler on any vehicle includes providing the traveler content via seat-mounted screens, wherein while onboard the vehicles, the traveler content is updated in real-time via a satellite link.

14. The non-transitory computer readable medium of claim 13, where the transmitting comprises:

deleting, in response to detecting that the traveler has departed onboard the first vehicle, the traveler content departure port copy from the caching server of the departure port.

15. The non-transitory computer readable medium of claim 13, the instructions when executed by the processor further comprising functionality for:

transmitting, in response to detecting an initial vehicle assigned to the trip at the departure port of the trip, the traveler content to an initial traveler content repository onboard the initial vehicle to generate an traveler content initial onboard copy, wherein the traveler content initial onboard copy is intended to be provided to the traveler during the trip onboard the initial vehicle; and determining, in response to the initial vehicle departing the departure port, whether the traveler has boarded the initial vehicle, wherein transmitting the traveler content to the first traveler content repository is in response to detecting the traveler failing to board the initial vehicle for departure, and wherein the first vehicle is assigned to the trip based on a revised itinerary of the trip due to the traveler failing to board the initial vehicle for departure.

16. The non-transitory computer readable medium of claim 13, the instructions when executed by the processor further comprising functionality for:

deleting, in response to detecting the traveler completing a portion of the trip assigned to the first vehicle, the traveler content first onboard copy from the first traveler content repository onboard the first vehicle.

17. The non-transitory computer readable medium of claim 13 wherein there is no access to the source of the traveler content from the destination accommodation.

* * * * *